Figure 1:
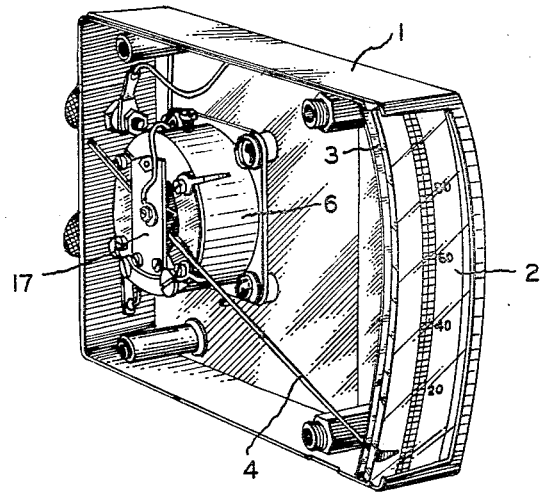

May 27, 1958

N. P. MILLAR ET AL 2,836,796

ADJUSTABLE ELECTRICAL MEASURING AND
INDICATING INSTRUMENT

Filed Aug. 27, 1954

3 Sheets-Sheet 1

Inventors:
Norval P. Millar
Earl W. Clark
by, Richard E. Hosley
Their Attorney

May 27, 1958

N. P. MILLAR ET AL 2,836,796

ADJUSTABLE ELECTRICAL MEASURING AND
INDICATING INSTRUMENT

Filed Aug. 27, 1954

3 Sheets-Sheet 2

Inventors:
Norval P. Millar
Earl W. Clark by, Richard E. Harley

Their Attorney

Inventors:
Norval P. Millar
Earl W. Clark
by, Richard E. Hooley
Their Attorney

United States Patent Office 2,836,796
Patented May 27, 1958

2,836,796

ADJUSTABLE ELECTRICAL MEASURING AND INDICATING INSTRUMENT

Norval P. Millar, Danvers, and Earl W. Clark, East Lynn, Mass., assignors to General Electric Company, a corporation of New York Application August 27, 1954, Serial No. 452,682

4 Claims. (Cl. 324—151)

This invention relates to measuring and indicating instruments and is concerned in particular with arrangements for allowing adjustments of the magnetic circuits of such instruments to vary the scale distribution and full scale deflection characteristics thereof.

It is well known that in the manufacture of such instruments, the characteristics of the various components will vary slightly from one instrument to the next within certain unavoidable tolerance limits. And it is, of course, desirable from the cost standpoint to avoid the necessity for matching the scales of such instruments to each individual instrument to take into account these slight variations. Such a practice is also to be avoided from the standpoint of replacement parts since once the instrument is in service, it is a very desirable feature from the customer's viewpoint to be able to purchase standard replacement parts which are interchangeable among all instruments of the same design.

Consequently it has always been an objective of the industry to provide, insofar as the development of the art would allow, standard components which can be mass produced to minimize cost and which can be interchanged among different instruments of the same design.

One of the most difficult areas in this respect involves the problems of providing an instrument capable of utilizing a standard printed scale interchangeable among all instruments of the same type since, unless special and more costly manufacturing techniques or steps are employed in the manufacturing process, the scale distribution and full scale deflection characteristics will vary from one instrument to the next by reason of the normal manufacturing variations in dimensions, material, assembly etc.

The advantages to be derived from providing a standard interchangeable scale are so substantial that it has in certain cases been the practice to employ special manufacturing techniques to match the instrument characteristics to a standard printed scale. In other cases, various types of adjusting arrangements are provided, which can be set in the factory after the instrument has been assembled to adjust the characteristics of the instrument to conform with the scale markings.

In view of the foregoing, it is accordingly one object of this invention to provide an improved low cost arrangement for permitting the deflection characteristics of a measuring and indicating instrument to be adjusted so as to allow calibration with a standard printed scale.

It is another object of this invention to provide an improved adjusting arrangement which permits the full scale deflection of an instrument for a predetermined full scale current to be adjusted without substantially disturbing the scale distribution characteristics thereof.

Briefly stated, this invention, in accordance with one embodiment thereof, provides adjustable magnetic members, which members form part of the magnetic circuit of the instrument and which define a portion of the air gap in which a deflectable coil is mounted, together with means for allowing rapid and simple adjustment of the aforesaid magnetic members to vary both the scale distribution characteristics and the full scale deflection point of the instrument to conform with a standard printed scale. This invention also provides adjustable magnetic circuitry for permitting adjustment of the full scale deflection point of an instrument for a predetermined full scale current without substantially affecting the scale distribution characteristics thereof. This invention thus allows measuring and indicating instruments to be manufactured on a quantity basis with interchangeable printed scales.

Other objects and advantages of this invention will be apparent from the following description taken in connection with the accompanying drawings forming a part thereof, and its scope will be pointed out in the appended claims.

Figure 2:
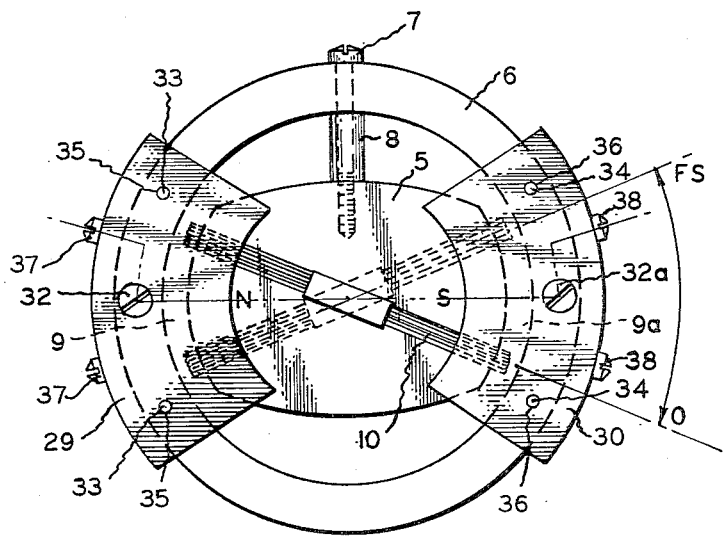
Figure 3:
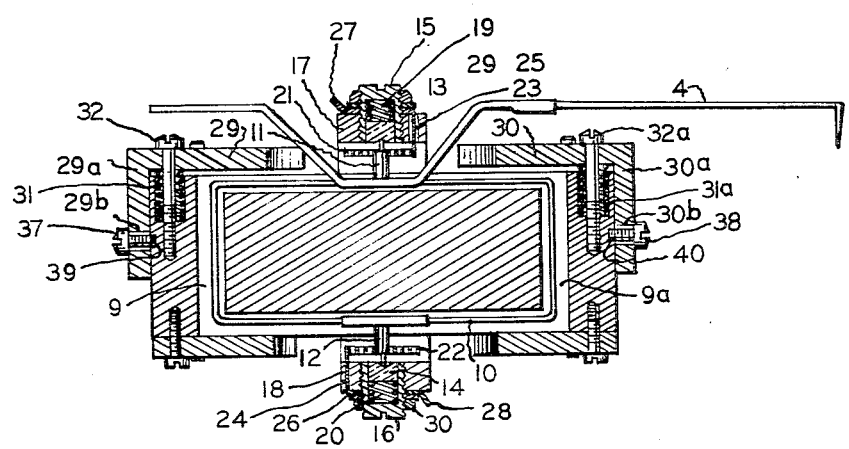
Figure 4:
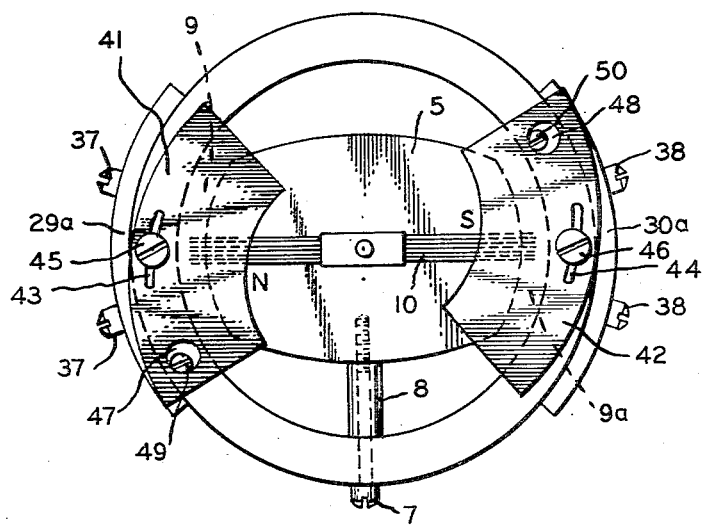
Figure 5:
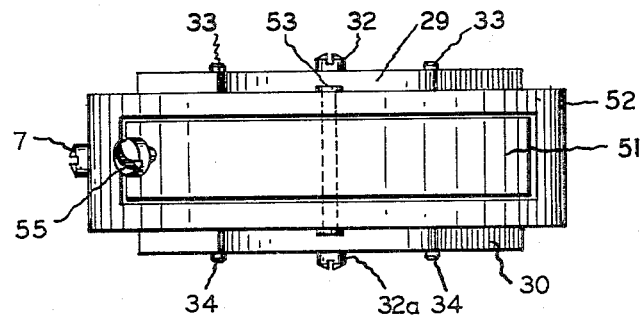
Figure 6:
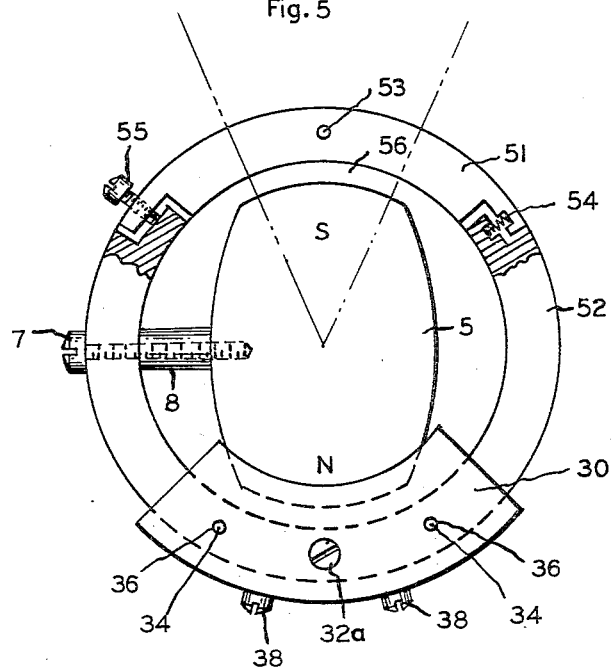

Referring to the drawings, Fig. 1 is a perspective view, shown partly in cross section, of an electric indicating and measuring instrument embodying this invention; Fig. 2 is a side elevational view of the internal mechanism of the instrument shown in Fig. 1; Fig. 3 is a plan view of the mechanism of Fig. 2; Fig. 4 is a side elevational view illustrating the opposite side of the mechanism shown in Fig. 2; Fig. 5 is a plan view of an alternative arrangement for the internal mechanism of the instrument of Fig. 1 and illustrates another embodiment of this invention; while Fig. 6 is a side elevational view of the embodiment shown in Fig. 5.

The instrument illustrated in Fig. 1 and embodying this invention is of the type which can be described as a vertical edgewise instrument and comprises an outer casing 1 and a transparent dial cover 2 which together form the outer enclosure for the instrument. In the illustration, one side of the casing 1 has been cut away to allow showing of the internal mechanism arrangement. Extending immediately behind the dial cover 2 is a dial plate 3 bearing suitable indicia calibrated in the desired measurement units and a pointer 4 is mounted so as to be registerable therewith.

The internal mechanism of the instrument of Fig. 1, which is illustrated in more detail in Figs. 2, 3, and 4, is commonly referred to as being of the internal magnet type. In this arrangement, a permanent magnet 5, having north and south poles as indicated is mounted within an annular ring 6 of magnetic material in any suitable manner such as by means of a screw 7 and is positioned within the ring by means of a spacer bushing 8. The permanent magnet 5 is mounted within the annular ring 6 so as to form air gaps 9 and 9a between the ring and the permanent magnet adjacent the north and south poles thereof.

Thus the permanent magnet 5 sets up a magnetic field which, to choose a starting point at the north pole of the magnet, extends across the air gap 9 to the annular ring 6 around the annular ring and back across the air gap 9a to the south pole of the magnet. An elongated substantially rectangularly shaped coil 10 is supported on a pair of spindles 11 and 12 which are in turn pivotally supported in any well known manner such as in a pair of jewel bearings 13 and 14 suitably mounted in the instrument casing or in the structural assembly of the internal mechanism.

Such a mounting arrangement is shown in Fig. 3 and comprises adjustable bearing cups 15 and 16 which are threaded into structural supporting members 17 and 18. Shock absorbing springs 19 and 20 are provided in the cups 15 and 16 to resiliently support the bearings. Control springs 21 and 22 are provided for resiliently opposing deflection of the coil assembly and are connected at their inner ends to the spindles 11 and 12 which are in turn electrically connected to opposite ends of the coil 10. The outer ends of the control springs are connected to tab portions 23 and 24 which extend in from washers 25 and 26 through arcuately shaped slots in the supporting members 17 and 18.

The washers 25 and 26 can be rotated a limited amount to adjust the force exerted by the control springs 21 and 22 in order to properly zero the instrument. The washers 25 and 26 also serve as terminals for the coil 10 since they are connected to the ends of the coil through the control springs 21 and 22 as has been described and electrical leads 27 and 28 are connected to the washers 25 and 26 to allow energization of the coil. The bearing assemblies are locked in place by means of nuts 29 and 30, which are externally threaded onto the bearing cups 15 and 16 as shown.

The end portions of the coil 10 extend through the air gaps 9 and 9a and with an electrical current flowing in the coil a torque will be developed tending to cause deflection by reason of the interaction of the electromagnetic field produced by the coil and the field produced by the permanent magnet 5. In the particular arrangement described herein, the zero deflection point of the coil has been chosen with the coil in the position shown in Fig. 2 and the full scale deflection point is identified by the position shown in the dotted lines in Fig. 2. The pointer 4 is connected to the coil 10 in any suitable manner such as is shown in Fig. 3 so as to be deflectable with coil and thereby indicating a reading on the printed scale plate 3. The pointer 4 is not shown in Figs. 2, 4, 5, and 6 in order to allow the remaining features of the instrument to be illustrated with greater clarity.

Arrangements of the general type just described are quite conventional and are quite commonly employed in one form or another in instruments of this general type.

In the quantity manufacture of instruments falling within this general category, that is instruments which utilize the general principle of a coil deflectably mounted in a magnetic field, it has been extremely difficult to control the dimensions, materials, and assembly operations with sufficient exactness and uniformity from one instrument to the next to allow the use of standard printed scales which will be interchangeable among all instruments of the same design. The problems arising in this connection and some of the prior art practices have already been described above. This invention accordingly provides adjustable magnetic circuitry for such instruments which allows for minor adjustments to be made to compensate for the above-mentioned variations in characteristics from one instrument to the next thereby allowing standard printed scales to be employed.

For a description of such an arrangement illustrating one embodiment of this invention reference is made to Figs. 2, 3, and 4. Referring in particular to Figs. 2 and 3, a pair of members 29 and 30, formed of a magnetic material, are adjustably mounted on the ring 6. Portions of the members 29 and 30 extend out over the side portion of the coil 10 as shown thereby forming a part of the magnetic circuit and defining a portion of the air gap in which the coil deflects. It will be seen that with the provision of the plates 29 and 30 the total magnetic reluctance of the circuit will be decreased and that the side portions of the coil adjacent the plates will contribute a greater amount of torque tending to cause deflection, since the flux density along the sides of the coil is increased by the proximity of the plates to the permanent magnet 5.

The plates 29 and 30 extend over an arc of greater than 45°, which is the full deflection sweep of the coil 10 in the instrument illustrated, and the amount by which the plates radially overlap the adjacent coil portions is constant regardless of the amount of deflection as can be seen by referring to Fig. 2. In other words both the width and the length of the air gap formed between the plates 29 and 30 and the magnet 5 are constant across the deflection sweep of the coil so that the scale distribution is not greatly affected by the provision of these plates.

The plates 29 and 30 are spring-loaded away from the magnet 5 by means of a pair of springs 31 and 31a and can be adjusted either toward or away from the magnet by means of screws 32 and 32a. Each plate is provided with a pair of guide pins 33 and 34 which are affixed to the ring 6 and which slide in corresponding holes 35 and 36 in the plates 29 and 30 as they are adjusted and serve to maintain the plates in a position where the amount of overlap with the adjacent side of the coil 10 is constant across the deflection of the coil with adjustment of the plates. The plates are further guided by cylindrically shaped extensions 29a and 30a which are shaped to mate with the outer cylindrical surface of the ring 6.

The plates 29 and 30 may be locked in place by means of locking screws 37 and 38 which extend through elongated slots 29b and 30b in the plates 29 and 30 and into tapped holes 39 and 40 in the ring 6. Thus when the plates are adjusted to the desired spaced relationship to the magnet 5, the screws 37 and 38 can be tightened down to secure the plates in that position.

It will be seen that with the arrangement just described, a portion of the air gap in which the coil is mounted becomes adjustable uniformly across the full sweep of the coil. Thus the flux distribution across the sweep of the coil is not greatly changed by adjustment of the plates 29 and 30 although the flux density in the air gap between the plates and the magnet 5 is directly affected by the resulting changes in the length of the air gap. The net result is that the flux density in the vicinity of the portions of the coil 10 which are adjacent the plates 29 and 30, can be increased or decreased simultaneously across the full sweep of such coil portions thereby increasing or decreasing the total torque developed by the coil 10 for a given current flowing therein by substantially the same percentage across the full scale sweep of the coil.

It will be seen therefore that this arrangement allows adjustment of the full scale current of the instrument without substantially disturbing the scale distribution characteristics thereof. The term "full scale current," as commonly defined, and as used herein, refers to the current in the instrument coil at which full scale deflection of the coil and its associated indicating means occurs.

In order to give an example of the relative effects on full scale current and scale distribution characteristics resulting from adjustment of the plates 29 and 30, the following figures, which are representative of this relationship in one instrument embodying this invention, are set forth. In that case it was determined that for an adjustment range allowing for a variation of the full scale current of the instrument by some six percent, the maximum change in the scale distribution characteristics of the instrument at any point on the scale was less than one half percent of the full scale deflection of the instrument. It can thus be seen that the scale distribution characteristics of the instrument would not be substantially disturbed even by relatively large adjustments of the full scale current thereof.

A second pair of plates 41 and 42 are provided at the opposite end of the ring 6 from the plates 29 and 30, and are adjustable in a different manner to vary the scale distribution characteristics of the coil 10. The plates 41 and 42 are also formed of a magnetic material and extend over a portion of the sides of the coil 10 but as can be seen from the illustration of Fig. 4 the amount of overlap of the plates 41 and 42 with the adjacent side of coil 10 can be adjusted so as to vary with the deflection of the coil. This adjustability is accomplished by the provision of elongated slots 43 and 44 in each of the plates 41 and 42, the slots engaging screws 45 and 46 respectively, and by the provision of enlarged holes 47 and 48 in the plates 41 and 42, engaging respectively pins 49 and 50 which are affixed to and extend out from the ring 6. It can be readily seen that this arrangement allows the plates 41 and 42 to be laterally adjusted with respect to the ring 6 so that the amount of overlap of the plates 41 and 42 with respect to the coil 10 is no longer constant with deflection. Thus the flux distribution in the air gap between the plates 41 and 42 and the magnet 5 can be adjusted along the sweep of the coil 10 to change the scale distribution characteristics thereof.

It will be realized however that lateral adjustments of the plates 41 and 42 will have quite a substantial effect on the full scale current of the instrument as well as on the scale distribution characteristics thereof and accordingly the plates 41 and 42 would first be adjusted to obtain the desired scale distribution characteristics and the plates 29 and 30 would then be adjusted as described above in order to obtain the proper full scale current. As has already been pointed out, adjustment of the plates 29 and 30 to obtain the proper full scale current has a very minor effect upon the scale distribution characteristics which have already been obtained by adjustment of the plates 41 and 42, so that once the plates 41 and 42 are adjusted to the desired setting, it will be normally unnecessary to re-adjust the plates 41 and 42 after adjustment of the plates 29 and 30.

Referring now to the embodiment shown in Figs. 5 and 6, there is illustrated an alternative arrangement for adjusting the scale distribution characteristics of an instrument. This arrangement may be advantageously employed, as shown in Figs. 5 and 6, in combination with the circuitry previously described comprising the plates 29 and 30 adjustable to trim the full scale current to the desired setting after the scale distribution characteristics have been adjusted.

The arrangement shown in Figs. 5 and 6 for allowing adjustment of the scale distribution characteristics of an instrument comprises an adjustable member 51 which forms a portion of an annular ring 52, otherwise similar to the ring 6 previously described. The adjustable member 51 is pivotally mounted on a pin 53 which extends into the ring 52 as shown in Fig. 5. The member 51 can be pivotally adjusted on the pin 53 against the force of a spring 54 by means of a screw 55. It will be seen that this construction allows adjustment of the air gap 56 across the sweep of the instrument coil, the limits of which sweep are identified by the phantom lines in Fig. 6 although the coil itself is not shown in Figs. 5 and 6.

It will be seen by referring to Fig. 6 that when the left hand portion of the member 51 is moved away from the magnet 5 by adjustment of the screws 55, the right hand portion thereof is thereby moved inwardly toward the magnet 5. Such an adjustment will decrease the flux density along the left hand portion of the air gap 56 and increase the flux density along the right hand portion thereof and thereby change the scale distribution characteristics of the instrument. It will be apparent that the member 51 may also be adjusted in the opposite direction to obtain an effect opposite to that just described.

Thus, the scale distribution of the instrument may be varied by adjustment of the member 51 to obtain the proper characteristics, after which adjustment the plates 29 and 30 may then be adjusted as previously described to obtain the desired full scale current without substantially disturbing the scale distribution characteristics.

It will be appreciated that the magnetic circuitry set forth herein may be varied to suit other configurations than the particular one shown and that the various components may be adjustably mounted in other ways than those illustrated and described herein or employed individually or in combinations other than those shown. Accordingly it can be seen that various modifications, changes, combinations and substitutions, which are too numerous to set forth herein, may be employed in accordance with these teachings without departing from the true scope and spirit of this invention as defined in the appended claims.

What we claim as new and desire to secure by Letters Patent of the United States is:

1. A measuring and indicating instrument comprising a permanent magnet, an annular ring extending around said permanent magnet in spaced relationship thereto, a pivotable coil concentrically mounted within said ring and extending around said magnet with the end portions of said coil extending into the air gap formed between said magnet and said ring, a plate of magnetic material mounted on said ring and having a portion thereon extending adjacent a portion of a side of said coil over the full normal sweep of said coil side portion, said plate being positioned so as to be equidistant from said permanent magnet at any point within the normal full sweep of said coil, and adjusting means for allowing said plate to be adjusted toward and away from said permanent magnet in a direction parallel to the axis about which said coil pivots including means for maintaining said plate in a relationship wherein said plate is equidistant from said permanent magnet at any point within the normal full sweep of said coil, whereby said plate may be adjusted to vary the flux density in the air gap between said plate and said permanent magnet simultaneously across the full sweep of said coil side portion.

2. The combination defined by claim 1 wherein said plate of magnetic material includes a downwardly extending ring portion which fits around the outer surface of a portion of said annular ring.

3. The combination defined by claim 2 wherein said annular ring has spring means mounted therein which press upon said plate to urge it away from said permanent magnet, said ring portion has a slot elongated in the direction of motion of said plate, and a threaded clamping bolt carried by said annular ring passes through said elongated slot such that tightening of said bolt serves to clamp said plate in any selected position.

4. The combination defined by claim 3 wherein said annular ring carries a pair of spaced guide pins located on opposite sides of said spring means and extending toward said plate in the direction of its motion, said plate having a pair of spaced apertures through which said guide pins extend.

References Cited in the file of this patent

UNITED STATES PATENTS

| | | |
|---|---|---|
| 591,241 | Shallenberger | Oct. 5, 1897 |
| 627,908 | Davis | June 27, 1899 |
| 1,597,327 | Obermaier | Aug. 24, 1926 |
| 1,952,160 | Faus | Mar. 27, 1934 |
| 2,515,014 | Lamb | July 11, 1950 |

FOREIGN PATENTS

| | | |
|---|---|---|
| 486,695 | Great Britain | June 9, 1938 |